(12) United States Patent
Cambou (10) Patent No.: US 10,992,463 B2
(45) Date of Patent: Apr. 27, 2021

(54) COMMUNICATION OVER QUANTUM CHANNELS WITH ENHANCED PERFORMANCE AND SECURITY

(71) Applicant: Arizona Board of Regents on Behalf of Northern Arizona University, Flagstaff, AZ (US)

(72) Inventor: Bertrand F Cambou, Flagstaff, AZ (US)

(73) Assignee: Arizona Board of Regents on Behalf of Northern Arizona University, Flagstaff, AZ (US)

( * ) Notice: Subject to any disclaimer, the term of this patent is extended or adjusted under 35 U.S.C. 154(b) by 150 days.

(21) Appl. No.: 16/372,231

(22) Filed: Apr. 1, 2019

(65) Prior Publication Data

US 2019/0305942 A1    Oct. 3, 2019

Related U.S. Application Data

(60) Provisional application No. 62/651,532, filed on Apr. 2, 2018.

(51) Int. Cl.
*H04L 9/08* (2006.01)
*H04L 29/06* (2006.01)
*H04L 9/32* (2006.01)

(52) U.S. Cl.
CPC ............ *H04L 9/0858* (2013.01); *H04L 9/085* (2013.01); *H04L 9/3271* (2013.01); *H04L 63/0428* (2013.01)

(58) Field of Classification Search
CPC ... H04L 9/0858; H04L 9/085; H04L 63/0428; H04L 9/3271; H04L 9/0838; H04L 9/0662; H04L 9/3278; H04L 9/0852; H04L 63/061; H04L 2463/061; H04L 63/0485
USPC ........................................................ 713/171
See application file for complete search history.

(56) References Cited

U.S. PATENT DOCUMENTS

| | | | |
|---|---|---|---|
| 7,403,623 B2 | 7/2008 | Cerf et al. | |
| 7,831,049 B1* | 11/2010 | Kanter | H04L 9/0858 380/256 |
| 7,889,868 B2 | 2/2011 | Wellbrock et al. | |
| 2017/0150347 A1* | 5/2017 | Kowalevicz | H04L 9/0891 |

OTHER PUBLICATIONS

Branciard et al., "Security of two quantum cryptography protocols using the same four qubit states", Phys. Rev. A. 72.032301, published Sep. 1, 2005 by The American Physical Society, https://doi.org/10.1103/PhysRevA.72.032301 [doi.org], 18 pages.

(Continued)

*Primary Examiner* — Mohammad W Reza
(74) *Attorney, Agent, or Firm* — Quarles & Brady LLP (57) ABSTRACT

This invention disclosure describes how the security of existing quantum key distribution protocols can be enhanced with the use of a ternary/binary arithmetic conversion along with shared keys between communicating parties. With these schemes, Bob can detect eavesdropping attacks without exchanging the content of the transmitted data stream with the Alice. Addressable physical unclonable function (PUF) technology can be exploited to design protocols that securely exchange the shared keys.

16 Claims, 5 Drawing Sheets

(56) References Cited

OTHER PUBLICATIONS

Gröblacher et al., "Experimental quantum cryptography with qutrits", New Journal of Physics 8 (2006) 75, Published May 26, 2006, IOP Publishing Ltd and Deutsche Physikalische Gesellschaft, online at http://www.njp.org/, doi:10.1088/1367-2630/8/5/075, 8 pages.

Habib et al., "Public key exchange scheme that is addressable (PKA)," 2017 IEEE Conference on Communications and Network Security (CNS), Las Vegas, NV, 2017, https://doi.org/10.1109/CNS.2017.8228693 [doi.org], pp. 392-393.

Scheur et al., "A Classical Key-Distribution System Based on Johnson (like) noise—How Secure?", Cornell University, arXiv:physics/0601022, 10.1016/j.physleta.2006.07.013, 5 pages.

\* cited by examiner

| | Starting stream | Initial conversion | Shared Key | Stream after transformation | Quantum distribution | Stream after distribution | Shared Key | Stream after reconstruction | Final stream |
|---|---|---|---|---|---|---|---|---|---|
| I | 3 trit<br>-<br>0<br>+ | Pairs of bits<br>→ 01<br>0 → 00<br>+ → 11<br>Missing: 10 | Pairs of Bits<br>00<br>01<br>10<br>11 | Pairs of bits<br>00<br>01<br>10<br>11 | By pairs of binary qubits and two bases | Pairs of bits<br>00<br>01<br>10<br>11 | Pairs of bits<br>00<br>01<br>10<br>11 | Pairs of bits<br>00<br>10<br>10<br>11 | 3 trits<br>01 → -<br>00 → 0<br>11 → +<br>10 → error |
| II | 2 bits<br>0<br>1 | 2 trits<br>-<br>+<br>Missing: 0 | 3 trits<br>-<br>0<br>+ | 3 trits<br>-<br>0<br>+ | By ternary quabits and two bases | 3 trits<br>-<br>0<br>+ | 3 trits<br>-<br>0<br>+ | 3 trits<br>-<br>0<br>+ | 2 bits<br>- → 0<br>+ → 1<br>0 → error |
| III | 3 trits<br>-<br>0<br>+ | 3 quatrits<br>→ ψ₀<br>0 → ψ₁<br>+ → ψ₂<br>Missing: ψ₃ | 4 quatrits<br>ψ₀<br>ψ₁<br>ψ₂<br>ψ₃ | 4 quatrits<br>ψ₀<br>ψ₁<br>ψ₂<br>ψ₃ | By quaternary quabits and two bases | 4 quatrits<br>ψ₀<br>ψ₁<br>ψ₂<br>ψ₃ | 4 quatrits<br>ψ₀<br>ψ₁<br>ψ₂<br>ψ₃ | 4 quatrits<br>ψ₀<br>ψ₁<br>ψ₂<br>ψ₃ | 3 trits<br>ψ₀ → -<br>ψ₁ → 0<br>ψ₂ → +<br>ψ₃ → error |

*FIG. 5*

COMMUNICATION OVER QUANTUM CHANNELS WITH ENHANCED PERFORMANCE AND SECURITY

CROSS-REFERENCE TO RELATED APPLICATIONS

The present application claims priority to U.S. Provisional Application 62/651,532 entitled "Strengthening Quantum Key Distribution with Addressable Physically Unclonable Functions and Ternary States" and filed on Apr. 2, 2018.

BACKGROUND OF THE INVENTION

Conventional secure communication techniques involve transmitting encrypted information over a channel such as an electrical transmission line, a fiber-optic cable, or through free space using electromagnetic waves. Such techniques make use of cryptographic methods utilizing shared secrets (i.e., a cryptographic key) between a sender and a receiver to ensure that only the intended parties can properly encode and decode a message. However, these techniques are vulnerable to eavesdropping which may lead to the content of the communication being compromised. Advanced techniques use quantum cryptographic methods which include quantum key distribution (QKD) protocols to enhance security. Quantum cryptography takes advantage of consequences of the Heisenberg uncertainty principle, namely that measurement of a quantum state necessarily disturbs that state. In practice this means that any eavesdropper to a communication over a properly implemented quantum channel will disturb the communication, revealing the presence of the eavesdropper. A shared encryption key may be generated and transmitted over a potentially insecure quantum channel, followed by verification that the key was not intercepted.

Many QKD protocols are based on the use of two random number generators. The first random number generator determines which of two possible sets of basis states (denoted by "X" and "+") will be used by the sender to emit each of a stream of qubits over an optical quantum channel. The second random number generator is used to select one of the two possible bases as a measurement basis for the incoming stream of qubits. After transmission, both communicating parties, in an example referred to as Alice and Bob, share the respective sequence of bases they used to select a portion of the stream transmitted and received with the same bases (i.e., x/x or +/+) and use this portion to construct a shared key. Under normal conditions, the expectation is that such a portion of the stream should contain a very small number of errors. The portion of the stream transmitted with misaligned bases, (i.e., either x/+or +/x, contains many errors and is ignored. However, when eavesdropping of the stream of qubits has occurred, the error rate will be much higher than expected. In order to determine whether eavesdropping has taken place, the error rate must be measured by the sender and receiver by exchanging partial information about the key over an unsecured channel. If the number of errors is small, the communicating parties assume that the key distribution was secure.

BRIEF SUMMARY

In an embodiment a method comprises receiving a message digitally encoded as a first string of symbols having a first length and a first radix; applying an encoding transformation to modify the first string of symbols into a second string of symbols having a second length and a second radix,; and transmitting an electronic signal encoding the second string of symbols to a receiver over a suitable communication channel using a suitable transmission protocol such that any interception of the electronic signal alters the message. The encoding transformation is configured to exclude a set of invalid symbols in the second radix from the second string. Transmitting the message to the receiver over the suitable communication channel using the suitable transmission protocol may include applying a cryptographic transformation to the second string of symbols using a cryptographic key to produce an encrypted string. The encrypted string including at least one symbol from the set of invalid symbols. Transmitting the message to the receiver over the suitable communication channel using the suitable transmission protocol may further include selecting the encrypted string as the electronic signal encoding the second string of symbols.

In another embodiment a method comprises receiving an electronic signal from a sender by a receiver. The electronic signal encodes a message as a string of symbols having a received length and a received radix. The method further comprises applying a decoding transformation to the received string of symbols to generate a decoded string of symbols having a decoded length and a decoded radix; determining that the decoded string of symbols contains one or more invalid symbols belonging to a set of invalid symbols in the decoded radix; and generating, by the processing circuitry of the receiver, based on the determination that the decoded string of symbols contains one or more of the invalid symbols, a message verification result indicating that the received message is an altered message resulting from alteration of an original message during transmission. The processing circuitry may be further configured to indicate, as part of message verification result, that the message has been intercepted by an eavesdropper in response to the decoded string containing a number of symbols belonging to the set of invalid symbols, the number of symbols being greater than a predetermined threshold.

In another embodiment a system for securely receiving a message comprises an electronic receiving device and processing circuitry coupled to the electronic receiving device. The processing circuitry is configured to receive an electronic signal encoding a message as a string of symbols from a sender via the receiving device. The string of symbols has a received length and a received radix. The processing circuitry is further configured to apply a decoding transformation to represent the received string of symbols digitally as a decoded string of symbols having a decoded length and a decoded radix. The processing circuitry is further configured to determine that the decoded string includes one or more invalid symbols belonging to a set of invalid symbols in the decoded radix; and generate, based on determining that the decoded string includes one or more of the invalid symbols, a message verification result indicating that the message was altered during transmission. The processing circuitry may be further configured to indicate, as part of message verification result, that the message has been intercepted by an eavesdropper in response to the decoded string containing a number of symbols belonging to the set of invalid symbols, the number being greater than a predetermined threshold.

The above features and advantages of the present invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

Conventional quantum key distribution approaches have disadvantages. In particular, using the example of Alice and Bob, conventional QKD requires Bob to tell Alice the contents of a portion of Alice's transmission (as measured by Bob) over a separate (and likely insecure) channel. This is inefficient, reducing the bandwidth of any secure communication between Alice and Bob and may also introduce an additional point of vulnerability in attempts to communicate securely with Alice. The present disclosed systems and methods eliminate the need to for Bob to share a sample of the stream of qubits received by Bob receives when Alice and Bob's bases are aligned in order to detect an eavesdropper. As long as Bob knows where the positions with aligned bases are, Bob can analyze the received stream and detect eavesdropping with no need for further communication with Alice.

Accordingly, the present disclosure may use a ternary cryptographic approach as well as other measures, such as keys based on physical unclonable functions (PUFs) to address shortcomings of conventional secure communication methods using quantum channels and improve performance, as will be described below. Before sending data over a quantum channel, the sender takes data encoded using digits of a first radix (e.g., ternary) and transforms the data into multiple digits in a lower radix (e.g., binary) in a fashion that ensures the data will be expressed using fewer values than the total number of available values for the number of digits used in the chosen radix. The data is then transmitted over a quantum channel (or other channel having the property that eavesdropping will introduce transmission errors) in such a way that transmission errors will introduce previously absent values into the data stream. Thus, a receiver can estimate the rate of errors in the transmission without the need to exchange additional data with the sender. Additional security is gained by using PUFs whose outputs are shared by the sender and receiver instead of using randomly generated keys as in certain conventional QKD protocols.

An exemplary shortcoming of conventional quantum communication protocols is that they require the sender and receiver to exchange information in order to check for errors which would indicate the presence of an eavesdropper. If the parties use a conventional QKD protocol, this exchange exposes part of the string used to agree upon a cryptographic key, requiring the key to be longer than otherwise required. In addition, this information exchange introduces overhead which limits the practical communications bandwidth of the channel. In addition, while quantum communication methods are assumed to be safe against simple eavesdropping, they are not safe against man-in-the-middle attacks which can occur during the QKD process.

The combination of quantum communication channels (or classical channels which share important characteristics of quantum channels that similarly allow with ternary cryptography and addressable PUFs allows the design of communication protocols which have the potential to strengthen existing key distribution protocols or improve communications over quantum channels by replacing conventional QKD protocols. These protocols are able to detect eavesdropping without exchanging additional information between the parties, which would otherwise occur if communicating using conventional quantum communication protocols (including during a conventional QKD protocol). Eliminating this additional information exchange required in conventional QKD protocols further enhances security.

The conversion of ternary to binary arithmetic, ternary to quaternary, or in more general terms from two different arithmetic bases as disclosed above, can introduce vulnerability because the transmitted data is no longer entirely random (only some of the possible values will appear in the transmitted data, allowing an eavesdropper to surmise whether they have chosen the correct measurement basis. However, this is addressed by the encrypting the datastream using keys shared by Alice and Bob to produce a datastream which includes all possible values until properly decrypted, as discussed further herein.

Addressable PUF generators are excellent candidates to design shared key schemes between transmitting parties that are tamper-resistant and very low power. Keys generated in this manner can be used to augment QKD protocols, adding additional security to quantum communication methods. Each of the options have advantages and varies in performances in terms of data rate and in their ability to sense eavesdropping. In some cases, there is a tradeoff between the data rate of transmission and sensitivity to eavesdropping.

Figure 1:
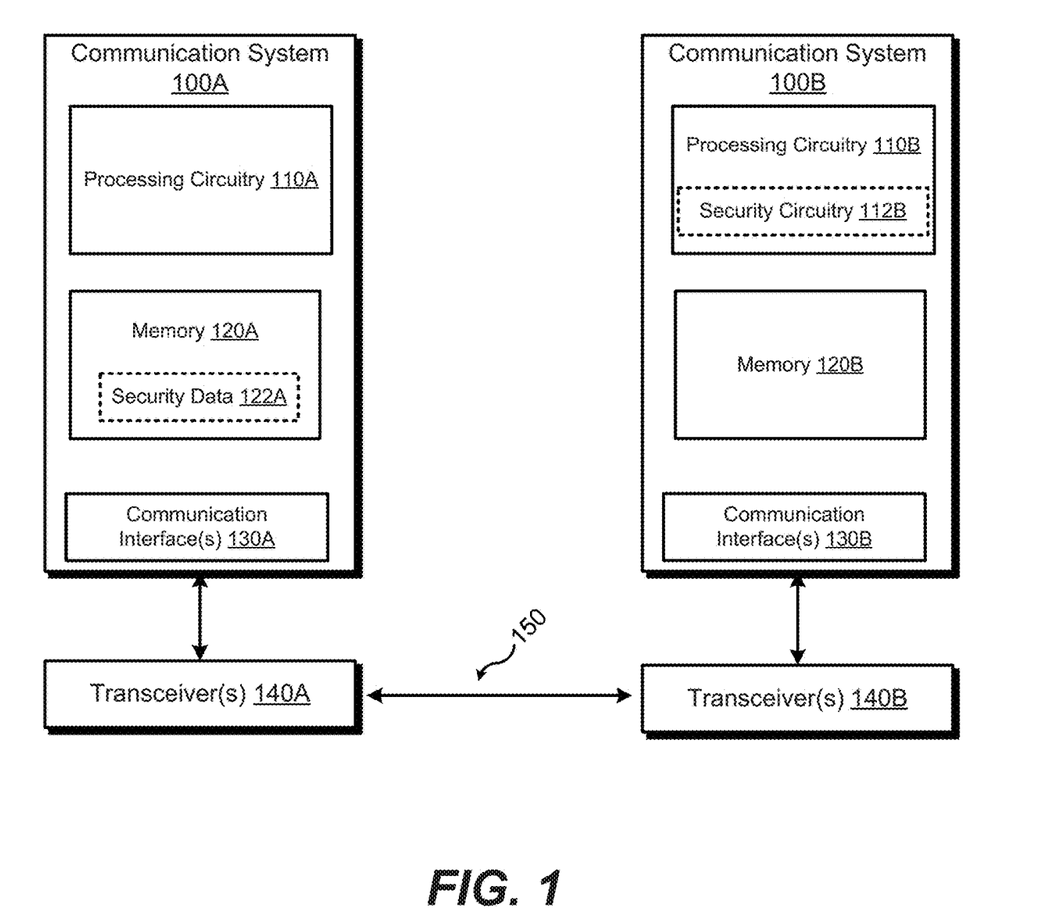
FIG. 1 depicts a schematic of example communication systems in which embodiments disclosed herein may be practiced.

FIG. 1 is a schematic illustrating communications systems in which embodiments disclosed herein may be practiced. In this example, communication system 100A acts as the sender ("Alice") and communication system 100B acts the receiver ("Bob"). The communication systems 100A/B each have respective processing circuitry 110A/B, memory 120A/B, communication interfaces 130A/B, and transceivers 140A/B. Each system communicates sends and/or receives information via its communication interface 140A/B. The communication interfaces 130A/B are coupled to transceivers 140A/B which send signals over a communication channel 150. The processing circuitry 110B of communication system 100B may optionally include security circuitry 112B, for use with certain embodiments disclosed herein. Similarly, the memory 120A of communication system 110A may optionally store security data 122A for use with certain embodiments.

In embodiments of the communication system 100B having the security circuitry 112B, the security circuitry 112B may include a dedicated PUF array. In such embodiments, the processing circuitry 110B may be configured to respond to an authentication challenge which specifies an address (or range of addresses) in the PUF array and a set of operations to perform in order to generate a unique response to the authentication challenge. Such embodiments may be designed to communicate with embodiments of communication system 100A configured to store security data 122A in the memory 120A. In such embodiments, the processing circuitry 110A is configured to generate authentication challenges and receive responses to those challenges. The responses and challenges may be saved as part of the security data 122A. In such embodiments the processing circuitry 110A may be further configured to send randomly-selected challenges to embodiments of communication system 100B having security circuitry 112B. In certain embodiments described herein, transmitting the challenges to communication system 100B allows communication systems 100A and 100B to agree upon the challenge responses as shared encryption keys without required information which might compromise the secrecy of those keys to be transmitted, as described below.

Figure 2:
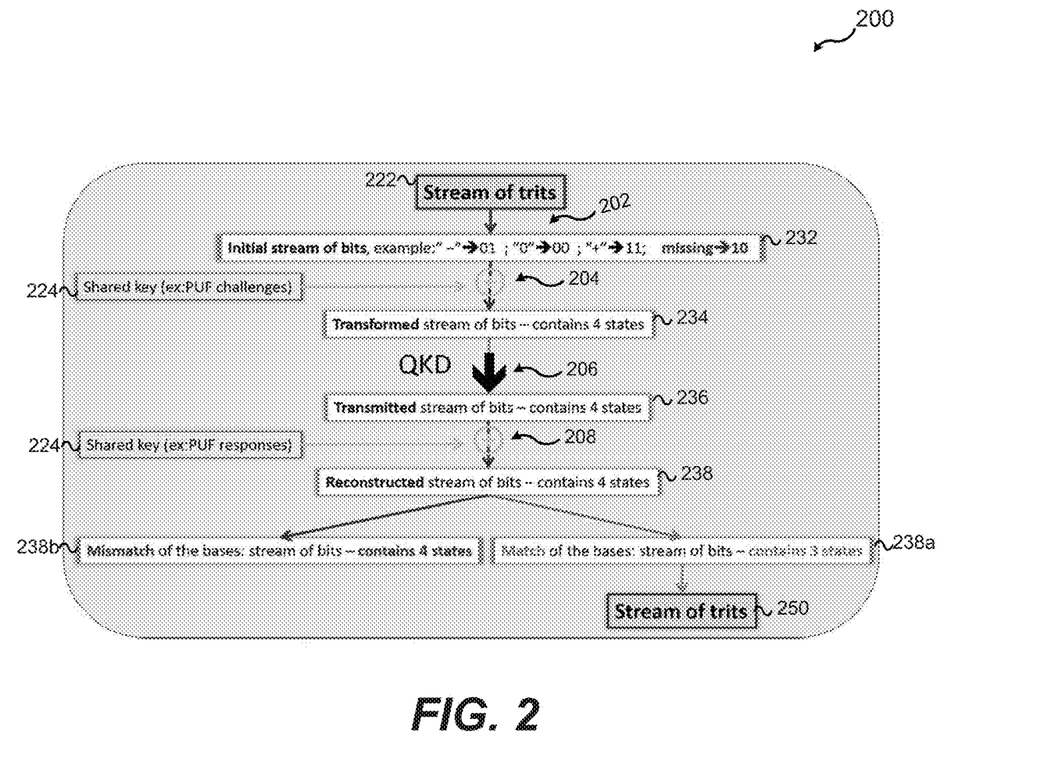
FIG. 2 depicts a flow chart of an example quantum key distribution protocol using ternary states and shared keys.

FIG. 2 is a flowchart illustrating an example procedure 200 for transmitting a message using embodiments disclosed herein, such as example communication system 100A and/or example communication system 100B.

Initially, the message or key to be distributed is provided as a stream of ternary digits ("trits"), i.e., trit stream 222. In some embodiments, the trit stream 222 is generated by processing circuitry such as processing circuitry 110A belonging to communication system 100A of FIG. 1. Because the trit stream 222 is composed of ternary digits, each position in the stream is occupied by one of three possible trits To avoid confusion, the set of three possible trits will be labeled as $\{-, E, +\}$.

At step 202, each trit in the trit stream 222 is converted to a binary representation to produce a bit stream 232. Because a binary digit (a bit) can only have one of two values $\{0,1,\}$ two bits are required to represent all possible values of a trit. For example, the binary trit '−' is represented in binary by '01', the trit '0' is represented by '00', and the trit '+' is represented in binary by '11.' Note that the mapping between trits and pairs of bits is arbitrary. The important feature is that each possible trit is represented by a unique binary string. Recall that two bits can represent up to four unique values: $\{00, 01, 10, 11\}$. Thus, in our example, the bit string '11' is not assigned to any possible trit.

At step 204 a secret shared key 224 shared between the sender and receiver is used to encrypt the initial bit stream 232 to produce a transformed bit stream 234. In one embodiment, the transformed bit stream 234 is the result of applying an XOR function to the key 224 and the initial bit stream 232. In certain embodiments to be described below, addressable PUF technology is used to share the shared key 224 securely. In alternate embodiments, the shared key 224 is generated using shared random numbers which address lookup tables of key values.

In an example, the shared key 224 is composed of the following bit pairs (01, 01, 00, 00, 10, 01, 01, 11,) and the initial stream of bit pairs 232 is (01, 01, 00, 00, 10, 01, 01, 11) If the transformation used is an XOR function, then the resultant transformed bit stream 234 is:

(1100011100110001)⊕(0101000010010111)=
(1001011110100110)

At step 206, the bit stream 234 is transmitted over a channel such as that specified in the BB84 Quantum key distribution (QKD) protocol. Similarly to BB84, the sender randomly chooses between two sets of basis states (e.g., the '+' basis or the 'x' basis). However, in the present invention, the procedure is modified so that each binary-encoded ternary value is transmitted using the same basis. In other words, the sender randomly selects a new basis for every two bits instead of for each individual bit. This maintains the traceability of the transmitted bit pairs.

In an example, the sender can generate a photon using a first basis with two possible states: horizontal polarization and vertical polarization (this basis will be called the rectilinear basis, or '+'). The sender can also generate a photon in a basis that is rotated by 45° from the first basis (this basis will be called the diagonal basis or 'X'). In other words, the horizontal and vertical polarization axes in the second basis are rotated 45° respectively from the horizontal and vertical polarization axes of the rectilinear basis. The conversion between binary-encoded ternary values and photon polarizations for this example is shown in Table I, below. Each row of table I corresponds to a possible bit pair Each bit is transmitted as one or more photons with a polarization axis defined by the choice of polarization basis ('+' or 'X') and the value of the bit. The photon polarizations for each bit pair are shown in the columns labeled "Rectinlinear basi ('+')" and "Diagonal Basis ('X')". For example when the rectilinear basis is used, the bit value '0' is transmitted as photons polarized horizontally (denoted by →) and the bit value '1' is transmitted as photons polarized vertically (denoted by ↑). The diagonal basis is rotated 45° from the rectilinear basis. Thus, in the diagonal basis the bit value '0' is transmitted as photons polarized horizontally in the rotated basis (denoted by ↗) and the bit value '1' is transmitted as photons polarized vertically in the rotated basis (denoted by ↖).

TABLE I

| Bit Pair | Rectilinear Basis ('+') | | Diagonal Basis (X) | |
|---|---|---|---|---|
| 00 | → | → | ↗ | ↗ |
| 01 | → | ↑ | ↗ | ↖ |
| 10 | ↑ | → | ↖ | ↗ |
| 11 | ↑ | ↑ | ↖ | ↖ |

Table II below illustrates an example of transmitting and receiving the transformed bit stream 234, consisting of eight binary-encoded ternary values, or 8 bit pairs. Each column indicates a bit pair belonging to the bit stream (ordered from 1 to 8). For each column the bit stream value to be transmitted is shown, along with Alice's choice of basis, Bob's choice of basis, and the resulting bit pair measured by Bob. The bit stream 234 in this example is (10, 01, 01, 11, 10, 10, 01, 01). As described above, the sender ("Alice") and receiver ("Bob") each select a basis for each bit pair. When Alice's basis and Bob's basis are the same, Bob measures the same values as transmitted by Alice if there has been no eavesdropping. However, when Alice and Bob randomly select different bases, Bob measures a random value. Instances of errors are shown in bold in Table II. Note that the process is not deterministic; for example, if the 5th bit pair were sent repeatedly using the same basis and measured repeatedly using the same basis, Bob might measure any of the four possible values of the bit pair.

TABLE II

|  | 1 | 2 | 3 | 4 | 5 | 6 | 7 | 8 |
|---|---|---|---|---|---|---|---|---|
| Transmitted: | 10 | 01 | 01 | 11 | 10 | 10 | 01 | 10 |
| Alice's basis: | + | X | + | + | X | + | X | X |
| Bob's basis: | + | X | X | + | + | X | X | + |
| Measured: | 10 | 01 | 01 | 11 | 01 | 11 | 01 | 01 |

Note that when Alice's basis is aligned with Bob's basis, Bob measures the same values as those transmitted by Alice. However, when the Alice's basis and Bob's bases are misaligned, each received bit will be measured randomly by the Bob as '0' or '1'. Using the same shared key as above, the Bob reconstructs a binary stream with a XOR function, according to one embodiment. A description of how this key can be shared with addressable PUF technology is described further on. An alternative method based on shared random numbers can also be used to share the keys.

At step 208, the transmitted bit stream 236 is reconstructed using the same shared key 224 and an XOR operation. Recall that, in the example, the shared key is (01, 01, 00, 00, 10, 01, 01, 11). Applying the XOR function to the key and the bit stream 236 we produce the reconstructed bit stream 238: (11, 00, 01, 11, 00, 11, 00, 01)⊕(01, 01, 00, 00, 10, 01, 01, 11)=(10, 01, 01, 11, 10, 10, 01, 10).

Next, Alice and Bob exchange information identifying which bases were used for transmission and detection. Bob then produces bit streams 238a and 138b. Bit stream 238a corresponds to bit pairs measured when Alice and Bob used the same basis. Bit stream 238b corresponds to bit pairs measured when Alice and Bob used different bases. When the binary data stream with matching bases 238a is retrieved, no errors are anticipated (or, if there is sufficient noise, a low error level); the final stream of trits is generated and used to communicate over the channel. For the non-matching positions, a high error rate is anticipated. Bob ignores these bits. Statistically, 25% of the pairs have the value (10) which is not associated with one of the possible trit values.

For example, if the matching positions are 1, 2, 4, and 7, then the binary stream is (11, 00, 11, 00) and the ternary stream is (+, E, +, E). In this example, the non-matching positions are 3, 5, 6, 8; the binary stream is (01, 11, 10, 10) and the ternary stream is (−, +, E, E) If an eavesdropper ("Eve") intercepts the communication between Alice and Bob, Eve will disturb qubits transmitted through the quantum optical channel. When Alice and Bob's bases are not aligned, the effect of Eve's eavesdropping will not be detected. However, when Alice and Bob's bases are aligned, no errors (or a very low error rate in the presence of noise sources) are expected. The insertion of a polarizer during eavesdropping randomly disturbs the qubits when the Eve's basis is misaligned with Alice and Bob's bases. This happens approximately 50% of the time; in this case, 25% of the pairs cannot be associated by Bob as valid trits. Altogether, during eavesdropping, 12.5% of the stream having aligned bases cannot be associated with valid trits which is an error rate that is usually well outside the acceptable range; this is easily detectable by Bob. Without exchanging the value of a stream of bits Alice, Bob knows that he is under attack by tracking the error rates.

Table III below illustrates the example above of Alice converting a trit string to a bit stream, encrypting the result with a shared key, and transmitting the encrypted string to Bob, as well as the process of Bob decoding the string. The effect of eavesdropping by Eve is also illustrated. Each column of Table III represents one trit value in a string of 8 trits, in order of position in the string, indicated by row labeled the "Position." Row by row, the table illustrates the various transformations undergone. Thus the trit string is given by the entries in the "Trit Value" row (+E−+E+E−), reading from position 1 to position 8.

The row labeled "Binary-encoded Trit" gives the binary-encoding value for the given trit. The row labeled "shared key" gives the portion of the shared key corresponding to the given position in the trit stream. The row labeled "Transmitted Bit Pair" gives the result of encrypting the bit stream with the shared key for each position (the XOR of the binary-encoded trit value and the corresponding portion of the shared key, in this example). Table III also has rows for Alice's choice of polarization basis when transmitting each bit pair, as well as the corresponding randomly chosen bases for Eve and Bob. The row labeled "Expected bit stream" indicates the value of the bit stream expected if Bob chooses the correct measurement basis. The row labeled "Actual bit stream received" indicates the bit stream values received by Bob given Bob's randomly-chosen measurement basis and given the presence of Eve and Eve's randomly-chosen measurement basis. The row labeled "Expected reconstruction" shows the expect bit values if Bob had chosen the right basis and if Eve was not present after decryption with the shared key (repeated for clarity). The row labeled "Actual reconstruction" shows the result of Bob decrypting the actual received bit stream with the shared key. Finally, the table includes rows for the trit values expected if Bob chose the correct basis and Eve was not present, contrasted with the actual trit values recovered.

TABLE III

|  | Position: | | | | | | | |
|---|---|---|---|---|---|---|---|---|
|  | 1 | 2 | 3 | 4 | 5 | 6 | 7 | 8 |
| Trit value: | + | E | − | + | E | + | E | − |
| Binary-encoded Trit: | 11 | 00 | 01 | 11 | 00 | 11 | 00 | 01 |
| Shared key: | 01 | 01 | 00 | 00 | 10 | 01 | 01 | 11 |
| Transmitted Bit Pair: | 10 | 01 | 01 | 11 | 10 | 10 | 01 | 10 |
| Alice's Basis | + | x | + | + | x | + | x | x |
| Eve's Basis | x | x | + | x | + | + | + | x |
| Bob's Basis | + | x | x | + | + | x | x | + |
| Expected bit stream: | 10 | 01 | 01 | 11 | 01 | 11 | 01 | 01 |
| Actual bit stream received: | 11 | 01 | 00 | 01 | 11 | 01 | 10 | 01 |
| Shared key: | 01 | 01 | 00 | 00 | 10 | 01 | 01 | 11 |
| Expected reconstruction: | 11 | 00 | 01 | 11 | 11 | 10 | 00 | 10 |
| Actual reconstruction: | 10 | 00 | 00 | 01 | 01 | 00 | 11 | 10 |
| Expected trit values: | + | E | − | + | + | − | E | − |
| Actual trit values: | E | E | E | − | − | E | + | E |

Referring to position 1 for the example in Table III, the initial trit value is '+', which is transformed into the bit pair '01'. The XOR of the bit pair and the corresponding portion of the shared key is '10'. Alice transmits '10' using the '+' polarization basis, which is intercepted by Eve using the 'x' polarization basis. Because Bob chose the wrong basis, but Eve chose the wrong one, Bob will measure random values instead of the expected ones. In this example, Bob measures '11' instead of '10', before applying the shared jet to generate a reconstructed value of '10' instead of the expected value of '11'. Converting back to a trit stream, Bob measures 'E' instead of the expected value of '+'.

It should be understood that although example embodiments discussed above have particular features, the invention disclosed herein is not limited to a specific implementation of those features. For instance, the example above encodes single trits as a pair of bits, switching the polarization basis for each bit pair. However, related encoding and transmission schemes may be implemented to achieve desired performance characteristics.

In one such alternate embodiment, a modified version of the protocol described above aggregates trits into groups of several trits (for example, groups of 5 trits) before converting these groups into groups of bits, (for example, in groups of 8 bits) and transmitting the groups of bits with QKD while preserving the integrity of the groups. The bases change alignment after transmitting each group (for example, after every group of 8 bits). In this example, a stream containing 500 trits is converted into a stream of 800 bits. The binary stream is transmitted through QKD by group of 8 bits, hundred times. Shared keys between Alice and Bob are used to detect eavesdropping, as presented above. Shared keys are used to transform the binary stream before transmission through the quantum channel, then to reconstruct the binary stream after transmission with the same shared key. Eavesdropping increases the error rates, and can be noticed by Bob without exchanging the value of the segments of the transmitted information.

In one embodiment, groups of 5 trits are converted to groups of 8 bits. There are $3^5=243$ possible groups of 5 trits, and $2^8=256$ possible groups of 8 bits. As an example, each possible trit string is converted to the 8-bit binary representation of the decimal value of that trit string (although any one-to-one mapping is acceptable). For instance, the 5-trit string with the lowest possible ternary value, (-----) or $(00000)_3$ or can be expressed in decimal notation as zero and is encoded by the 8-bit binary representation of zero, $(00000000)_2$. Similarly, the 5-trit string with the highest possible ternary value, $(22222)_3$ or (+++++), is encoded by the 8-bit binary representation of 242 which is $(11110010)_2$.

In this encoding, thirteen of the 256 possible 8-bit strings (or 5.08%) do not have a corresponding group of trits. For example, the 8-bit binary group $(11110111)_2$ is equivalent to 247 in decimal and does not correspond to a possible 5-trit grouping. After transformation with the shared key, all 256 configurations are possible. The quantum channel transmits the photons by eight. The random numbers rotating the polarizer, for base + or x, will transmit and receive eight photons together rather than switching at every photon to maintain traceability.

These bit strings are then transmitted as photons with polarizations determined by the basis chosen by Alice as shown above in Table I. For instance, the bit string $(0000000)_2$ is transmitted as (→→→→→→→→) in the '+' basis and as (↗↗↗↗↗↗↗↗) in the 'X' basis. Similarly, the bit string $(11111111)_2$ would be trasmitted as (↑↑↑↑↑↑↑↑) in the '+' basis and as (↖↖↖↖↖↖↖↖) in the 'X' basis. As a further example, the bit string $(11110010)_2$ would be trasmitted as (↑↑↑↑→↑↑→) in the '+' basis and as (↖↖↖↖↗↗↖↗) in the 'X' basis. Bob can convert these photon polarizations back to binary values by using properly oriented polarizers. For instance, when Alice uses the rectilinear '+' basis, Bob should use a polarizer oriented such that horizontally-polarized photons are blocked (indicating '0') and vertically-polarized photons are passed (indicating '1'). When Alice uses the diagonal 'X' basis, Bob should use a polarizer rotated by 45°.

When the eavesdropping party disturbs the transmission, 5.08% of the trits are going to be erratic after reconstruction of the ternary stream which is higher than the natural error rate created by undisturbed transmission over a quantum optical channel. Therefore, Bob should be able to detect eavesdropping on his own by analyzing the stream that transmitted with matching bases. Such a modified protocol is not as sensitive to errors as the protocol described above; however, the throughput is approximately 20% higher. This protocol use less possible random numbers for managing the bases. To send 8,000 bits through the quantum channel, 1,000 random numbers are needed by each communicating party rather than 8,000, which is not large enough.

It should also be understood that nothing in the example embodiments herein should be construed to limit encoding data as trits and then transmitting that data using binary states. Rather, the invention pertains any system where digital data is sent over a channel using an encoding capable of representing more values than the total possible values of the original data. When such an encoding is used over an appropriate quantum or other channel with similar properties, eavesdropping induces values in the transmitted data beyond those made available by the encoding scheme. This feature allows eavesdropping to be detected without requiring the transmitter and receiver ("Alice" and "Bob") to exchange information about the received data.

As an example, several quantum communication protocols support the direct transmission of trits across optical quantum channels. Previously described embodiments can be modified to achieve similar advantages by using a binary to ternary conversion, along with ternary keys shared between the communicating parties.

One example of a system allowing native transmission of trits involves transmitting photons with one of three polarization axes which are vertical (polarization axis of 90 degrees, '↑'), horizontal (polarization axis of 0 degrees, '→'), or diagonal (↗ or ↖) relative to one of two reference orientations such as those given by the two bases, '+' and 'x'. In this example, Alice uses n photons to transmit each trit and the value of the trit is represented by the number of photons received by Bob. Note, however, that four photon polarization axes (↑, →, ↗, ↖) are available between the two bases ('x' and '+'). When Alice and Bob communicate without eavesdropping Bob will always measure N, N/2, or 0 photons, corresponding to the three allowed trits. However, when Bob choses the correct basis and Eve intercepts the communication using a basis which does not match Alice's, Bob's measurements will be altered, including by sometimes measuring N/4 photons. Even is Bob cannot distinguish a change in the absolute number of photons, presence of Eve will also cause a change in the relative number of photons Bob measured for each trit in certain cases, ultimately allowing Bob to detect the presence of Eve. Such a method can be sensitive to partial eavesdropping when even only a fraction of the communication is intercepted. Table III illustrates the outcomes described above.

Table IV below illustrates the outcomes discussed above for this communication scheme. The values in the "Trit value" column indicate the possible trit. The "Photon state" column indicates the photon polarization corresponding to each trit value for each of Alice's two possible polarization basis choices. For each photon state, Table IV has four columns, each corresponding to a combination of polarizers for Bob and Eve. Instances where the presence of Eve's polarizer affects Bob's measurements are shown in bold.

The columns are grouped by Bob's polarizer choice. There are two columns for each of Bob's two possible choices (0° and) 45°, one where Eve's choice matches Bob's, and one where Eve's choice does not match Bob's.

TABLE IV

|  |  | Trit value | Photon state | Bob's Polarizer | | | |
|---|---|---|---|---|---|---|---|
|  |  |  |  | Bob Chooses 0° | | Bob Chooses 45° | |
|  |  |  |  | Eve's Polarizer | | | |
|  |  |  |  | Eve Chooses 0° | Eve Chooses 45° | Eve Chooses 45° | Eve Chooses 0° |
| Alice's Polarizer | Alice Chooses 0° (+) | –<br>E<br>+ | →<br>↗<br>↑ | N<br>N/2<br>0 | N/4<br>N/2<br>N/4 | N/2<br>N<br>N/2 | N/2<br>N<br>N/2 |
|  | Alice Chooses 45° (x) | –<br>E<br>+ | ↖<br>↑<br>↗ | N/2<br>0<br>N/2 | N/2<br>0<br>N/2 | N<br>N/2<br>0 | N/4<br>0<br>N/4 |

Figure 3:
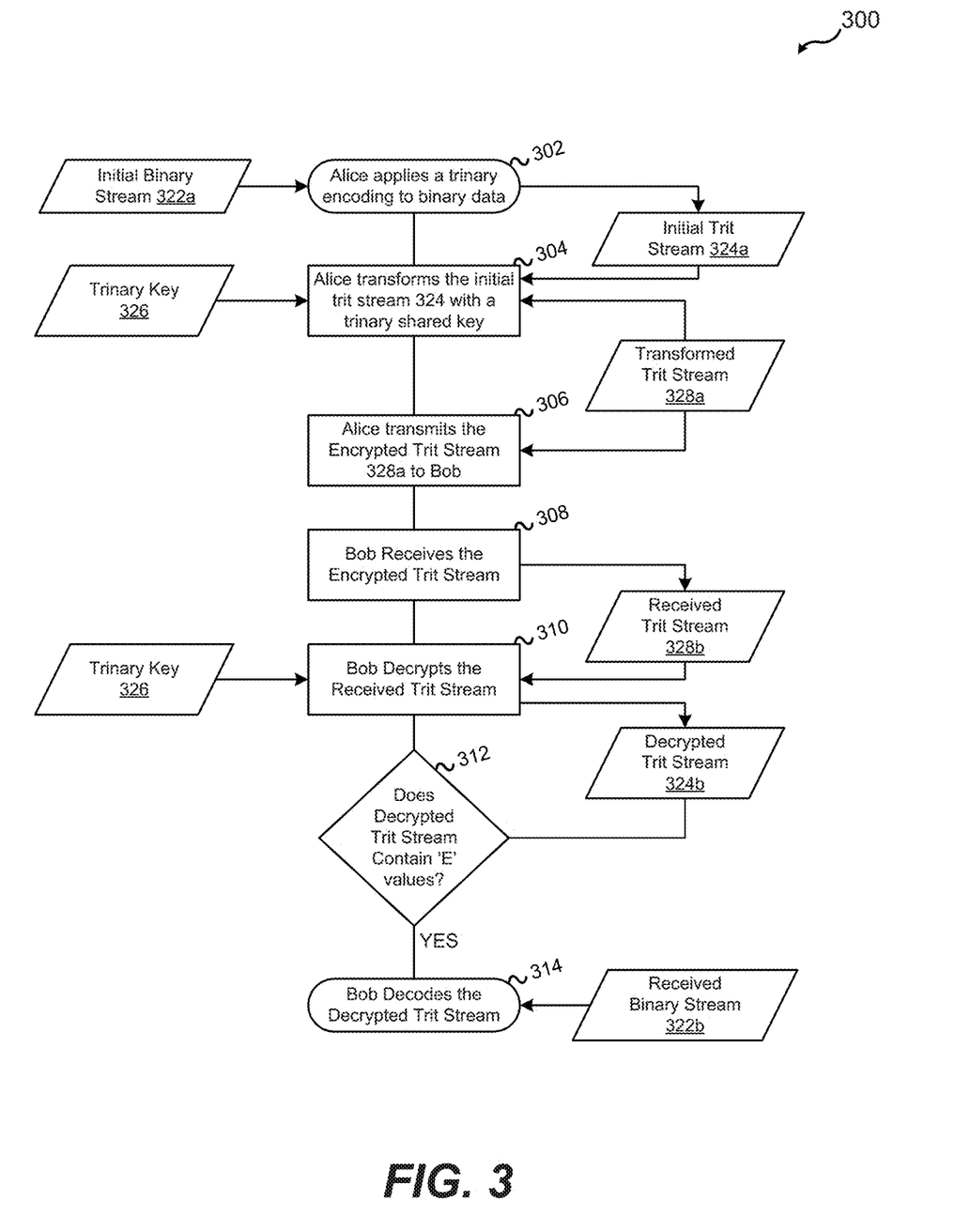
FIG. 3 depicts a flow chart of another example quantum key distribution protocol using ternary states and shared keys.

FIG. 3 illustrates an example protocol 300 for transmitting binary data in the embodiment above. First, at step 302 Alice converts an initial binary stream 322a into an initial trit stream 324a containing exclusively '–' and "+" states. For example the binary value '0' is encoded as the ternary value '–' and the binary value '1' is encoded as the ternary value '+'. For instance the binary string $(0110110010101101)_2$ is encoded as the ternary string (–++–++––+–++–+–+). Note that the ternary value 'E' does not appear because the ternary state "E" is not used in the encoding transformation.

Next, at step 304, the Alice encrypts the initial trit stream 324a. As an example, the string of trits is added, modulo-3, with a ternary key 326 produce a transformed trit stream 328a. As an example, if initial trit stream 324a is (–++–++––+–++–+––+) and the ternary key 326 is (E++–E E+–––+E–++E), then the sum of the two, modulo-3 is the transformed trit string 328a with values (–––+++E+E+–++–E+). At step 306, Alice transmits the transformed trit stream 328a using the photon polarizations described above.

At step 308, Bob receives the transformed trit string 328a after transmission by Alice as the received trit stream 328b and proceeds to decrypt at step 310 using the ternary key 326 which is shared between Alice and Bob. In this example, Bob adds the ternary key 306 and the received trit stream 328b twice to decrypt the received trit stream 328b, producing the decrypted trit stream 324b. Triple addition modulo-3 of the ternary key 326 is a neutral operation; therefore the decrypted trit stream 324b will be identical to the initial trit stream 324a if no errors have been introduced during transmission. When Alice and Bob's bases are aligned, Bob should not detect the ternary value 'E' in the resulting stream of trits; only '–' and '+' are expected. 'E' values will be only be detected in case of eavesdropping or another source of transmission errors.

At step 312, Bob checks to see if the decrypted trit stream 324b contains any 'E' values. When eavesdropping occurs, one third of the trits can be 'E' when Alice and Bob's bases are aligned, which is very high. The error rate will be lower in case of a partial interception of the stream; however, if the number N of trits transmitted per stream is low enough, partial interception will be also highly erratic for Eve. If the decrypted trit stream 324b does not contain any 'E' values, Bon can proceed to step 314 to decode the decrypted trit stream 324b to produce the received binary string 322b.

As disclosed above, the protocols above can be generalized to channels which support transmitting quaternary digits or digits in higher radixes. To illustrate we now discuss a system supporting four possible values per digit, $\{\Psi_0, \Psi_1, \Psi_2, \Psi_3\}$. In this example, an incoming stream of trits is converted into quaternary digits. The ternary value '–' is mapped to $\Psi_0$, the ternary value 'E' is mapped to $\Psi_1$ and the ternary value '+' is mapped to $\Psi_2$. The value $\Psi_3$ is not used in the encoding transformation.

The possible quaternary values of the shared key are mapped to bit pairs. For example the bit pairs in the set $\{(00), (01), (10), (11)\}$ are mapped to $\{\Psi_0, \Psi_1, \Psi_2, \Psi_3\}$, respectively. Note that, as above, the key may contain all four possible quaternary values. This prevents Eve from determining that the quaternary encoding of the transmitted message cannot contain the fourth quaternary value.

As above, the quaternary representation of the message is transformed (i.e., encrypted) using the shared key to produce a transformed stream. The incoming stream of quaternary digits is produced, for example by adding the stream with the key, modulo 4 (e.g., $\Psi_0+\Psi_1=\Psi_3$; $\Psi_0+\Psi_2=\Psi_2$; $\Psi_0+\Psi_3=\Psi_3=\Psi_0$; $\Psi_2+\Psi_2=\Psi_0$), as illustrated below:

| Initial Stream | $\Psi_2$ | $\Psi_2$ | $\Psi_0$ | $\Psi_1$ | $\Psi_1$ | $\Psi_2$ | $\Psi_2$ | $\Psi_0$ | $\Psi_0$ | $\Psi_1$ | $\Psi_0$ | $\Psi_1$ | $\Psi_1$ | $\Psi_0$ | $\Psi_2$ | $\Psi_1$ |
| --- | --- | --- | --- | --- | --- | --- | --- | --- | --- | --- | --- | --- | --- | --- | --- | --- |
| Shared Key | $\Psi_1$ | $\Psi_0$ | $\Psi_2$ | $\Psi_0$ | $\Psi_2$ | $\Psi_2$ | $\Psi_0$ | $\Psi_1$ | $\Psi_1$ | $\Psi_3$ | $\Psi_2$ | $\Psi_2$ | $\Psi_0$ | $\Psi_0$ | $\Psi_1$ | $\Psi_3$ |
| Transformed Stream | $\Psi_3$ | $\Psi_2$ | $\Psi_2$ | $\Psi_1$ | $\Psi_3$ | $\Psi_0$ | $\Psi_2$ | $\Psi_1$ | $\Psi_1$ | $\Psi_0$ | $\Psi_2$ | $\Psi_3$ | $\Psi_1$ | $\Psi_0$ | $\Psi_3$ | $\Psi_0$ |

After Alice transmits the quaternary digits over the quantum channel, Bob reconstructs the quaternary message stream. Without eavesdropping, the portion of the stream that was transmitted with Alice and Bob's bases aligned should consist only of the quaternary digits $\{\Psi_0, \Psi_1, \Psi_2\}$. When Eve intercepts the transmission and her basis is misaligned (which will happen with a probability of 50% for each quaternary digits) the quaternary value $\Psi_3$ will be measured by Bob 25% of the time, which is easily detected. This protocol can achieve twice the throughput of conventional quantum communication protocols and does not require Alice and Bob to exchange additional information in order to detect an eavesdropper.

The methods presented herein can be generalized to different arithmetic bases as long as two different arithmetic bases are involved in the protocol and when shared keys exchanged between the communicating parties are used to transform and reconstruct (i.e., encrypt and decrypt) the data as disclosed herein. Thus, in the case of binary-coded data, use of the XOR function as described above is a non-limiting example of a suitable encryption transformation and a second application of the XOR function using the shared key is a non-limiting example of a suitable decryption transformation. Similarly, in the case of ternary-coded data, modulo-3 addition using the shared key as described above is a non-limiting example of a suitable encryption transformation and double modulo-3 addition with the shared key is a non-limiting example of a suitable decryption transformation.

The methods described above make use of a secret key (e.g., shared key 224 or shared ternary key 326). It is desirable to have both parties able to independently find the same shared key without needing to communicate with each other. A simple version of such a protocol is to share a set of random numbers generated which can be generated by random number generators accessible by Alice and Bob and a table of keys with a key associated with each random number. I.e., each random number in the ordered set of possible random numbers $\{1, 2, 3, \ldots i, \ldots, N\}$ is associated with a corresponding key in the ordered set $\{K_1, K_2, K_3, \ldots K_i, \ldots K_N\}$.

If Alice and Bob each have their own respective random number generators, they must be synchronized such that at each event, they can point simultaneously to the same key that becomes the shared key described previously. The potential threats in such a scheme are insiders and side channel attacks capable of accessing the table of shared keys.

Figure 4:
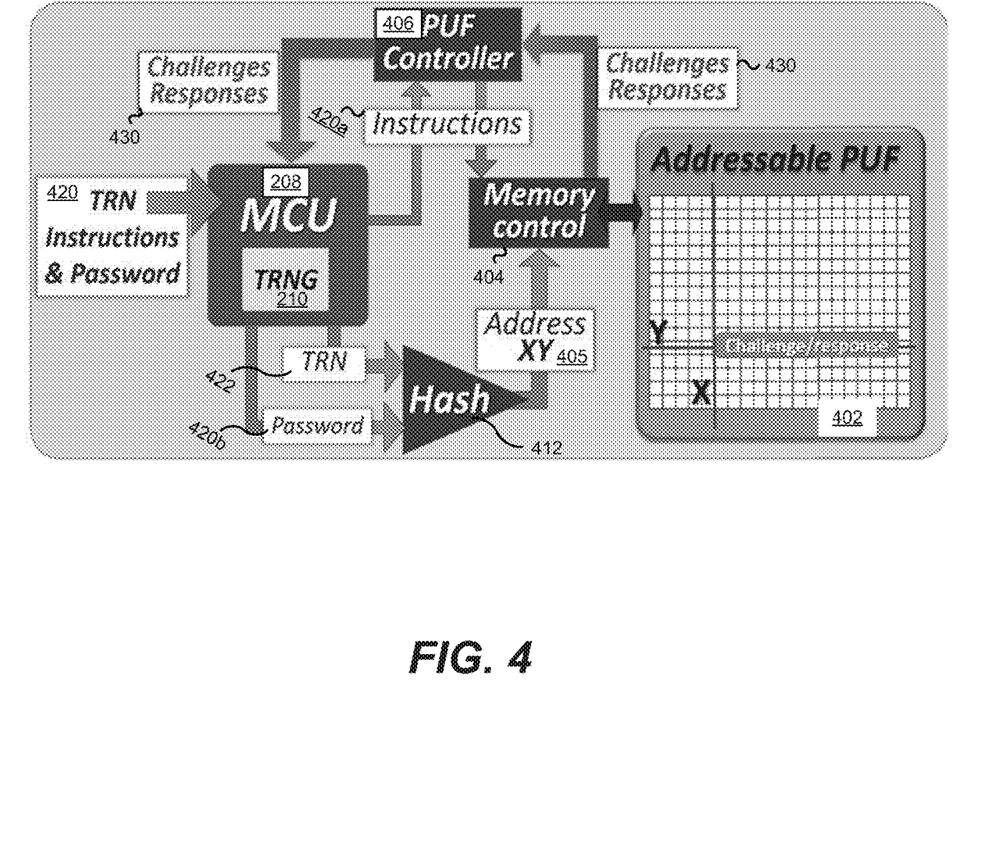
FIG. 4 depicts a block diagram describing a system for generating a shared key utilizing an addressable PUF array.

FIG. 4 illustrates an architecture used in an example embodiment for securely sharing a key (such as the secret key 224) using an addressable PUF array 402 and multifactor authentication. The PUF array 402 (shown here as a 2D-array of cells) can be addressed using a memory controller 404, which receives a specified address 405. The memory controller 404 is configured to return characteristics of the PUF array 402 at the address 405, as challenge response 430. The challenge responses 430 may be specific characteristic of queried cells (or ranges of cells), or may be derived from those characteristics. Non-limiting examples of such characteristics are time delays of transistor-based ring oscillators and transistor threshold voltages. Other non-limiting examples include optical devices. For example, Bob may possess an optical PUF device which, when illuminated by a light source such as a laser produces a unique image. This image may be digitized and the pixels may be used to form an addressable PUF array.

In this example Bob possesses a PUF such as PUF array 402. Upon activation, Bob needs to securely exchange with Alice (or another party from which Alice can securely retrieve information), the measurements of physical elements describing the PUF (or information derived from those measurements). This can be a set of parameters, P, produced by measuring each cell of the PUF array 402. A request to measure the parameters and/or perform further mathematical operations on those parameters may be variously referred to as "authentication challenges" or "challenges." The initial measurements of the PUF, may be various referred to as "authentication challenge responses," "challenge responses," or simply "responses." Using this terminology, Alice (or another party) generates a set of challenges during an initialization process and issues to challenges to Bob (or a party in possession of Bob's PUF at the time of the initialization). The responses obtained to the initial challenges are stored for reference by Alice. When Alice subsequently sends Bob a challenge, Bob can independently re-measure the parameter(s) P at the specific locations of his PUF array to generate appropriate challenge responses. Challenges and the corresponding challenge responses represent a fingerprint of the PUF. With quality PUFs, the hamming distance between challenges and responses is small.

As shown in FIG. 4, the challenges are generated by supplying a message 420 (which includes instructions 420a and a password 420b) to a microcontroller 408. The microcontroller 408 contains a random number generator such as the true-random-number generator (TRNG) 210, which sends the instructions 420a, which specify how to generate the challenge responses 430 to the memory controller 404. The memory controller 404 receives the instructions 420a and the desired address 405 to query. The desired address 405 is generated by a hash function 412 which hashes the combined password 420b and random number 422 to yield the address 405. Using the instructions 420a and the address 405, the memory controller 404 retrieves the appropriate challenge response 430 and delivers it to the memory controller 404, which delivers the appropriate challenge response 430 to the microcontroller 408. In this example, all possible challenges are issued in advance and the challenge responses 430 are stored by the microcontroller 408 in a lookup table prior to Alice and Bob communicating using the protocols described earlier. In certain preferred embodiments, the PUF array 402, and memory controller 404 are possessed by the receiver (Bob) while the microcontroller 408 is possessed by the transmitting party (Alice).

In one embodiment. Alice and Bob parties have the same random number generator as well as shared multifactor authentication keys such as passwords and a set of instructions. The random number and instructions identify the challenge and PUF elements to use to generate response. Alice already knows the challenge response because she has stored the response of Bob's PUF generated during the initialization process. Bob re-measures his PUF and re-generates the challenge response. The challenge response can therefore be used as a shared key in the protocol without requiring the key to be exchanged between Alice and Bob during the communication session.

A hostile party will not be able to read a tamper-proof PUF. Low power PUFs need only one femtojoule (fJ) to read a response which is below the noise level of any side channel attack. The hash function is a one-way cryptographic function preventing any party to find the input of the hash from the output (i.e., the message digest). Therefore, a third party cannot know which random number is associated with a portion of the array. Challenge-response-pair (CRP) error rates after error correction below 0.1% are sufficient to implement the protocols described above.

Figure 5:
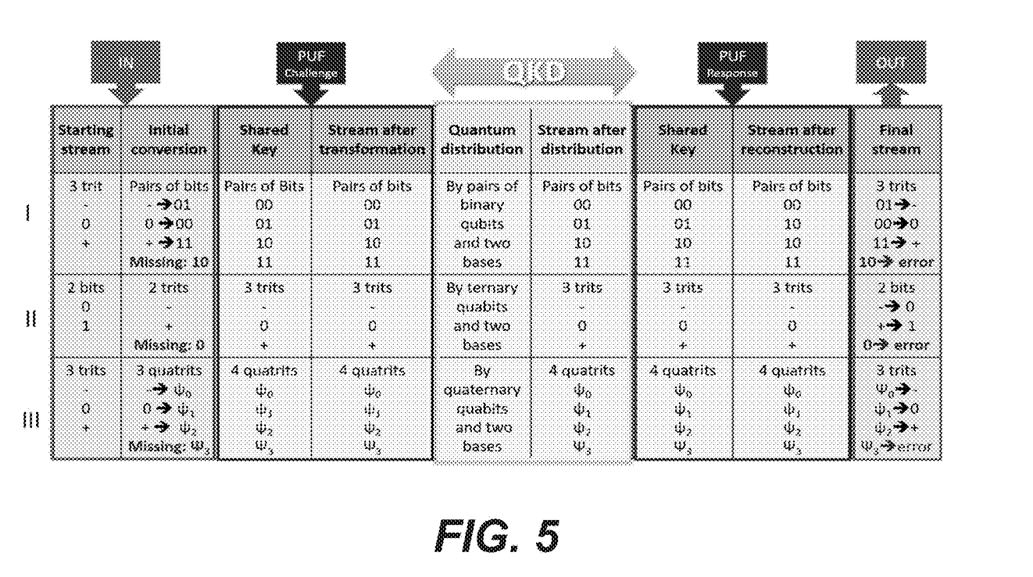
FIG. 5 depicts a summary of features of three example embodiments.

FIG. 5 is a table summarizing communication protocols disclosed herein for three exemplary embodiments across each of the three respective rows, labeled I, II, and III. The column labeled "starting stream" indicates the format of the initial data. The column labeled "starting stream" indicates the format of the stream after the initial encoding. The "shared key" column describes the format of the shared key. The "stream after transformation" column indicates the format of the data after transformation (encoding) with the shared key, and so on. For example, row I summarizes an embodiment where the initial stream is composed of trits having any of three values from the set {-, 0, +}. Each trit in the initial stream is represented as a bit pair. In this embodiment, the encoding never produces the bit pair '10'. The shared key is also composed of bit pairs, but the shared key may have any of the possible bit pairs {00, 01, 10, 11}. After transformation with the shared key, the data is a set of bit pairs have any of the four possible values (thus rendering the exclusion of '10' by the initial conversion undetectable to an eavesdropper). The transformed bit stream is then transmitted one bit-pair at a time over a quantum channel in one of two possible states relative to one of two polarization bases (for a total of four possible polarizations), as described above. The receiver receives a stream of bit pairs, After reconstruction with the shared key, the reconstructed stream is a stream of bit pairs which will only contain the value '10' when there has been a transmission error that may be used to detect eavesdropping.

Similarly, the row labeled II represents an embodiment where binary data is converted into trits where only two of three possible trit values are produced by the conversion transformation. After transformation with a ternary key which may contain any of three possible trit values, the stream is a stream of trits which may contain any of the three possible values. The stream is transmitted over a quantum channel (or other channel with equivalent properties) which natively allows for ternary signals using 3 states. After reconstruction with the shared key, the stream is a ternary stream where the binary values are represented using only two of the three possible trit values. Any presence of the ternary value '0' (elsewhere denoted by 'E') indicates a transmission error that may be used to detect eavesdropping.

Finally, the row labeled III represents a system where ternary data is encoded in a quaternary format and transmitted over a channel allowing native transmission of quaternary signals. The reconstructed stream is quaternary, where any presence of the quaternary value $\Psi_3$ indicates a transmission error that may be used to detect eavesdropping.

The invention claimed is:

1. A method, comprising:
   receiving a message digitally encoded as a first string of symbols having a first length and a first radix;
   applying an encoding transformation to modify the first string of symbols into a second string of symbols having a second length and a second radix, the encoding transformation configured to exclude a set of invalid symbols in the second radix from the second string;
   encoding each unique symbol in the second string of symbols as a unique measurable physical quantity defined within a respective measurement basis, wherein each unique measurable physical quantity is a polarization state of one or more photons and the unique measurable physical quantity is altered by measurement of the physical quantity; and
   transmitting an electronic signal encoding the second string of symbols to a receiver over a suitable communication channel using a suitable transmission protocol such that any interception of the electronic signal alters the message, wherein the suitable channel is a channel that preserves the physical quantity during transmission of the physical quantity and the suitable channel is an optical channel that preserves photon polarization during transmission of polarized photons.

2. The method of claim 1 wherein transmitting the message to the receiver over the suitable communication channel using the suitable transmission protocol includes:
   applying a cryptographic transformation to the second string of symbols using a cryptographic key to produce an encrypted string, the encrypted string including at least one symbol from the set of invalid symbols; and
   selecting the encrypted string as the electronic signal encoding the second string of symbols.

3. The method of claim 2 wherein the message is transmitted by a sender; and
   wherein the method further comprises, prior to transmitting the encrypted string, selecting the encryption key from a set of candidate keys using information possessed by both the sender and the receiver.

4. The method of claim 3 wherein the method, prior to transmitting the encrypted string, further comprises:
   generating a set of authentication challenges, each authentication challenge specifying computational instructions and a memory address, the computational instructions specifying a computation to be performed on measured characteristics of a portion of an addressable array of electronic devices accessible to the receiver, the portion being specified by the memory address;
   transmitting each challenge of the set of challenges to the receiver;
   receiving and storing by the sender, in response to transmitting each authentication challenge, a corresponding challenge response to that authentication challenge; and
   selecting a particular stored challenge response as the encryption key; and
   transmitting a particular authentication challenge corresponding to the particular stored challenge response to the receiver.

5. The method of claim 2 wherein the suitable protocol comprises:
   rendering the encrypted string into segments;
   choosing a respective physical measurement basis for each segment; and
   encoding each unique symbol in a particular segment as a unique measurable physical quantity defined within the respective measurement basis.

6. The method of claim 1, wherein:
   a maximum number of unique permutations of symbols having the first length in the first radix is N and a maximum number of unique permutations of symbols having the second length in the second radix is M;
   M is greater than N; and
   the encoding transformation is configured, when applied to a first set of N unique permutations of symbols having the first length and the first radix, to map the first set into an allowed set of fewer than M unique permutations of symbols having the second length and the second radix; and
   each unique permutation of symbols in the allowed set excludes the set of invalid symbols.

7. A method, comprising:
   receiving an electronic signal from a sender by a receiver, the electronic signal encoding a message as a string of symbols having a received length and a received radix, wherein each symbol in the string of symbols is encoded as a polarization state of one or more photons and the polarization state of the one or more photons is altered by measurement of the polarization state of the one or more photons;

applying a decoding transformation to the received string of symbols to generate a decoded string of symbols having a decoded length and a decoded radix;

determining that the decoded string of symbols contains one or more invalid symbols belonging to a set of invalid symbols in the decoded radix; and generating, by processing circuitry of the receiver, based on the determination that the decoded string of symbols contains one or more of the invalid symbols, a message verification result indicating that the received message is an altered message resulting from alteration of an original message during transmission.

8. The method of claim 7, wherein the processing circuitry is further configured to indicate, as part of message verification result, that the message has been intercepted by an eavesdropper in response to the decoded string containing a number of symbols belonging to the set of invalid symbols, the number of symbols being greater than a predetermined threshold.

9. The method of claim 7, wherein receiving the message includes:

selecting a cryptographic key from a set of candidate keys; and decrypting an encrypted string of symbols received as the message to produce the received string of symbols.

10. The method of claim 9 wherein selecting the cryptographic key from the set of candidate keys includes:

receiving an authentication challenge from the sender, the authentication challenge specifying computational instructions and a memory address, the computational instructions specifying a computation to be performed on measured characteristics of a portion of an addressable array of electronic devices, the portion being specified by the memory address;

measuring the characteristics of the portion of the addressable array specified by the memory address and performing the computation on the measured characteristics to produce a response to the authentication challenge; and selecting, as the cryptographic key, the response to the authentication challenge.

11. The method of claim 7, wherein:

a maximum number of unique permutations of symbols having the decoded length in the decoded radix is N and a maximum number of unique permutations of symbols having the received length in the received radix is M;

M is greater than N; and the decoding transformation is an inverse of an encoding operation;

the encoding transformation is configured, when applied to a first set of N unique permutations of symbols having a first length and a first radix, to map the first set into an allowed set of fewer- than-M unique permutations of symbols having a the second length and a second radix; and each unique permutation of symbols in the allowed set excludes the set of invalid symbols.

12. A system for securely receiving a message comprising:

an electronic receiving device and processing circuitry coupled to the electronic receiving device;

wherein the processing circuitry is configured to:

receive an electronic signal encoding a message as a string of symbols from a sender via the receiving device, the string of symbols having a received length and a received radix and wherein each symbol in the string of symbols is encoded as a polarization state of one or more photons and the polarization state of the one or more photons is altered by measurement of the polarization state of the one or more photons;

apply a decoding transformation to represent the received string of symbols digitally as a decoded string of symbols having a decoded length and a decoded radix;

determine that the decoded string includes one or more invalid symbols belonging to a set of invalid symbols in the decoded radix; and generate, based on determining that the decoded string includes one or more of the invalid symbols, a message verification result indicating that the message was altered during transmission.

13. The system of claim 12, wherein the processing circuitry is further configured to indicate, as part of message verification result, that the message has been intercepted by an eavesdropper in response to the decoded string containing a number of symbols belonging to the set of invalid symbols, the number being greater than a predetermined threshold.

14. The system of claim 12 wherein the processing circuitry is further configured to:

select a cryptographic key from a set of candidate keys; and decrypt an encrypted string of symbols received as the message to produce the received string of symbols.

15. The system of claim 14 wherein the system further comprises an addressable array of electronic devices, each electronic device of the of the addressable array having a unique physical characteristic;

wherein the processing circuitry is further configured, when selecting the cryptographic key from the set of candidate keys, to:

receive an authentication challenge from the sender;

extract computational instructions and a memory address from the authentication challenge, the computational instructions specifying a computation to be performed on measured characteristics of a portion of an addressable array of electronic devices, the portion being identified by the memory address;

measure the unique physical characteristics of the electronic devices forming the portion of the addressable array identified by the memory address and performing the computation on the measured physical characteristics to produce a response to the authentication challenge; and select, as the cryptographic key, the response to the authentication challenge.

16. The system of claim 12, wherein;

a maximum number of unique permutations of symbols having the decoded length in the decoded radix is N and a maximum number of unique permutations of symbols having the received length in the received radix is M;

M is greater than N; and the decoding transformation is an inverse of an encoding operation;

the encoding transformation is configured, when applied to a first set of N unique permutations of symbols having a first length and a first radix, to map the first set into an allowed set of fewer-than-M unique permutations of symbols having a second length and a second radix; and each unique permutation of symbols in the allowed set excludes the set of invalid symbols.

* * * * *